Figure 1:
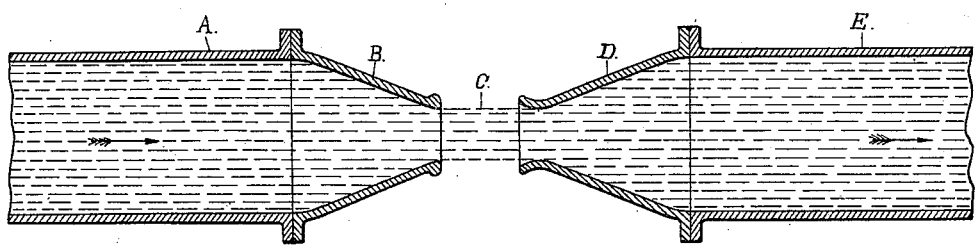

L. M. KARNASCH.
SAFETY DEVICE FOR HYDRAULIC SYSTEMS.
APPLICATION FILED AUG. 20, 1910.

991,624.

Patented May 9, 1911.

WITNESSES:

INVENTOR
Leopold M. Karnasch

UNITED STATES PATENT OFFICE.

LEOPOLD M. KARNASCH, OF SAN FRANCISCO, CALIFORNIA.

SAFETY DEVICE FOR HYDRAULIC SYSTEMS.

991,624.

Specification of Letters Patent.

Patented May 9, 1911.

Application filed August 20, 1910. Serial No. 578,129.

*To all whom it may concern:*

Be it known that I, LEOPOLD M. KARNASCH, a subject of the German Empire, and a resident of the city and county of San Francisco and State of California, have invented certain new and useful Improvements in Safety Devices for Hydraulic Systems, of which the following is a specification.

The invention relates to devices which are adapted to be used in pipe lines and other hydraulic systems to prevent an excess pressure in the line due to the sudden stop of the flow of the liquid. Such effects as, for instance, water hammer, caused by a sudden checking of the flow, cause a great rise in pressure which would be disastrous to the pipe line if not prevented or relieved.

In the automatic governing of hydraulic turbines, the flow of the water is often suddenly checked due to a decrease in the load, and it is the object of the present invention to provide simple automatic means whereby an excess in pressure in the pipe line is prevented.

To this object the invention comprises a break or by pass in the pipe line through which the excess pressure is allowed to be dissipated as it is formed.

In the drawings I have shown one form of apparatus for controlling the by-pass or relief, but it is to be understood that I do not limit myself to the exact construction shown, as many changes in size, proportions or minor details may be made without varying from the spirit of my invention.

Figure 2:
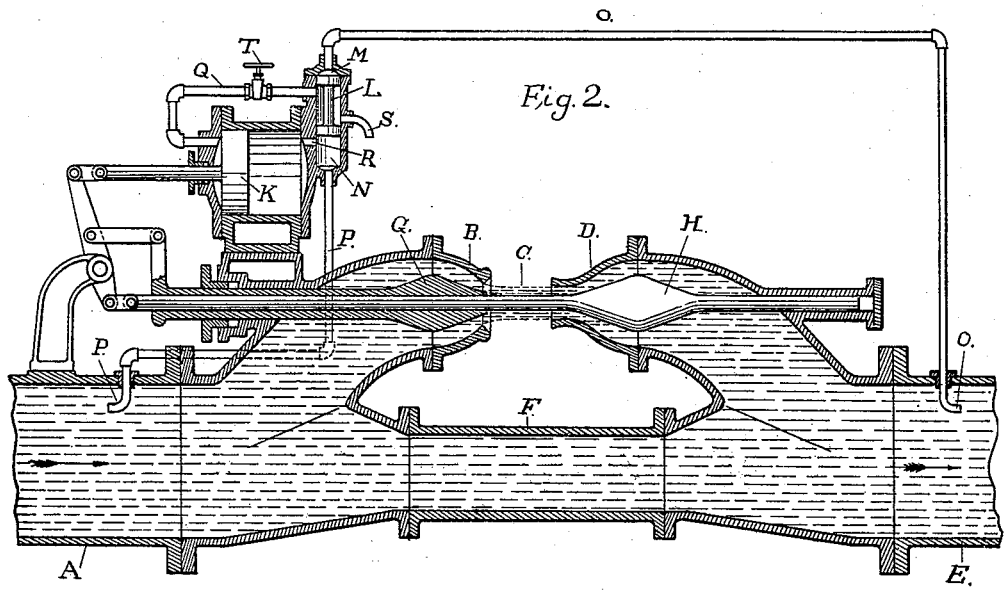

Figure 1 represents a section of pipe line in which is arranged a device constructed in accordance with the principle of my invention. Fig. 2 is a cross section through a similar device arranged in a by-pass and provided with automatic regulating means.

The water in pipe A, Fig. 1, under pressure of considerable head, is discharged through the nozzle B, where it obtains a spouting velocity due to the head. Arranged opposite the nozzle B is a similar nozzle D spaced apart from nozzle B, so that a suitable gap C intervenes between the two nozzles. The pipe E to which nozzle D is secured extends to the hydraulic apparatus which the water operates. The water spouting from nozzle B will only enter nozzle D when the pressure in pipe E is lower than the pressure in pipe A. When the flow of the water in pipe E is checked, the pressure therein rises to or above the pressure in pipe A and the water from nozzle B strikes on the body of water in nozzle D and is discharged or dispensed sidewise, thereby preventing a pressure in pipe E due to the potential energy of the water in pipe A.

To avoid any unnecessary loss of head due to friction at the nozzles and loss of water due to the side discharge, it is preferable to arrange the gap C in a by-pass in the pipe line so that only part of the total water flowing through the pipe line is discharged across the gap. An arrangement of this sort is shown in Fig. 2 there the main body of water passes through the pipe F and only a portion passes across the gap C. In this figure I have also shown a governing apparatus which closes nozzles B and D after the valve at the lower end of the line has been closed so that water is not wasted when the water is not being utilized. The apparatus is designed to close the nozzles after the water has ceased flowing and to open them when the valve is again opened. Needle valves G and H are connected with the piston K in such manner that a movement of the piston K to the right will close the valves and a movement in the opposite direction will open the valves. The valve L operates piston K by admitting water under pressure on either side of the piston. The valve L is operated by the difference in pressure in the pipes A and E.

The operation of the apparatus is as follows: I will presume that the needle valves G and H are shut and the water which has been at rest in the pipe starts to flow from A to E due to the opening of a valve at the lower end of E. Then as the water flows a higher pressure will occur in pipe P which has its open end facing the flow or up-stream than in pipe O which has its open end facing down-stream. Valve chamber N is connected with the pipe P and chamber M with pipe O, so that a greater pressure occurring in chamber N than in chamber M will force the plunger L toward chamber M and expose the port R through which water under pressure is admitted to the right side of piston K with the effect of moving that part to the left. The motion of this part K operates through the links and levers to operate the needle valves G and H and open the nozzles B and D.

Supposing now the flow of water through the pipe line is diminished or stopped, then the pressure at O becomes equal to the pressure at P and the pressure on both sides of plunger L is equal, allowing that part to fall by gravity to its lowest position, connecting port R with the exhaust pipe S and chamber M with the pipe Q, whereby the water under pressure is admitted to the left side of piston K through the said pipe Q. This pressure causes piston K to move to the right and close the nozzles by operating the needle valves G and H through the links and levers shown.

To provide for a sufficiently slow movement of the needle valves G and H when the nozzles are to be closed, I provide a valve T in pipe Q which is so set that the water admitted to the left side of piston K can only slowing escape. This slow closing of the valves is necessary to avoid any water hammer or excessive use of pressure in the pipe line.

I claim:

1. A pipe line having a contracted portion, branch lines connected to the pipe line on opposite sides of the contracted portion, the ends of the branches being open and lying in line with each other.

2. A pipe line having openings therein facing each other and means operated by the variation of pressure of the water in the pipe for closing said openings.

3. A pipe line divided into two sections, the ends of each section being spaced apart and facing each other, a nozzle on each end, a needle valve in each nozzle and means operated by the variation in pressure in the pipe for moving the needle valves to vary the size of the opening.

4. A safety device for a pipe line, comprising a by-pass for a short length of the line, the by-pass being divided into two sections, the ends of the sections being provided with nozzles, spaced apart and facing each other and needle valves in the nozzles operated by a variation in pressure in the pipe line to vary the size of the nozzle openings.

5. A safety device for a pipe line, comprising a contracted portion on the pipe line, pipes connected to the pipe line on opposite sides of the contracted portion, nozzles on the ends of the pipes lying in line with each other, and needle valves for varying the size of the openings in the nozzles.

6. A safety device for a pipe line comprising openings in the pipe in line with each other, needle valves adapted to vary the size of the openings, and means comprising a cylinder having a piston movable therein, operable by changes in pressure in the pipe line, for varying the positions of the needles.

LEOPOLD M. KARNASCH.

Witnesses:
ZOE HARRISON,
GRETA PAGE.